United States Patent
Wang et al.

(10) Patent No.: US 10,394,979 B2
(45) Date of Patent: Aug. 27, 2019

(54) METHOD AND DEVICE FOR ELASTIC OBJECT DEFORMATION MODELING

(71) Applicant: SHENZHEN INSTITUTES OF ADVANCED TECHNOLOGY CHINESE ACADEMY OF SCIENCES, Shenzhen, Guangdong (CN)

(72) Inventors: Bin Wang, Guangdong (CN); Hui Huang, Guangdong (CN); Longhua Wu, Guangdong (CN)

(73) Assignee: SHENZHEN INSTITUTES OF ADVANCED TECHNOLOGY CHINESE ACADEMY OF SCIENCES, Shenzhen, Guangdong (CN)

(*) Notice: Subject to any disclaimer, the term of this patent is extended or adjusted under 35 U.S.C. 154(b) by 261 days.

(21) Appl. No.: 15/392,688

(22) Filed: Dec. 28, 2016

(65) Prior Publication Data
US 2017/0109465 A1   Apr. 20, 2017

Related U.S. Application Data

(63) Continuation of application No. PCT/CN2015/088126, filed on Aug. 26, 2015.

(51) Int. Cl.
*G06F 17/11* (2006.01)
*G06F 17/16* (2006.01)
(Continued)

(52) U.S. Cl.
CPC .......... *G06F 17/5018* (2013.01); *G06F 17/11* (2013.01); *G06F 17/16* (2013.01); *G06T 13/00* (2013.01); *G06F 2217/16* (2013.01)

(58) Field of Classification Search
CPC ...... G06F 17/5018; G06F 17/11; G06F 17/16; G06T 13/00
(Continued)

(56) References Cited

U.S. PATENT DOCUMENTS

| | | | | |
|---|---|---|---|---|
| 5,524,636 A | * | 6/1996 | Sarvazyan | A61B 1/0052 600/587 |
| 5,988,862 A | * | 11/1999 | Kacyra | G01B 11/002 382/195 |

(Continued)

FOREIGN PATENT DOCUMENTS

| | | |
|---|---|---|
| CN | 101216950 | 7/2008 |
| CN | 101261741 | 9/2008 |

(Continued)

OTHER PUBLICATIONS

Nealen et al. (Physically Based Deformable Models in Computer Graphics, The Eurographics Association 2005, pp. 1-24). (Year: 2005).*

(Continued)

*Primary Examiner* — Brian S Cook
*Assistant Examiner* — Iftekhar A Khan
(74) *Attorney, Agent, or Firm* — Hamre, Schumann, Mueller & Larson, P.C.

(57) ABSTRACT

The present disclosure discloses a method and a device for elastic object deformation modeling. The method comprises: acquiring a static point cloud of the elastic object and dynamic point cloud sequences; establishing a simulation tetrahedral mesh model; driving the simulation tetrahedral mesh model to track the dynamic point cloud sequences, to obtain track deformation sequences; iteratively estimating material property coefficients and corresponding reference shapes of the elastic object; performing the following operations in each iteration: obtaining a reference shape corre- (Continued)

sponding to a current material property coefficient; driving the simulation tetrahedral mesh model to simulate the deformation from the same initial deformation according to the coefficient and the reference shape to obtain a simulation deformation sequences; calculating a positional deviation between the simulation deformation sequences and the track deformation sequences; and updating the material property coefficients in a direction in which the positional deviation is decreased; establishing an elastic object deformation model according to a material property coefficient under a minimum positional deviation and corresponding reference shape. The technical solution can establish a vivid elastic object deformation model.

12 Claims, 4 Drawing Sheets

(51) Int. Cl.
  *G06F 17/50* (2006.01)
  *G06T 13/00* (2011.01)
(58) Field of Classification Search
  USPC .............................................................. 703/2
  See application file for complete search history.

(56) References Cited

U.S. PATENT DOCUMENTS

| | | | | |
|---|---|---|---|---|
| 6,456,289 | B1* | 9/2002 | O'Brien | G06T 13/20 345/473 |
| 7,239,992 | B2* | 7/2007 | Ayache | G06T 13/20 434/262 |
| 8,004,517 | B1* | 8/2011 | Edelsbrunner | G06T 17/20 345/419 |
| 9,477,798 | B1* | 10/2016 | Guoy | G06T 17/20 |
| 9,760,688 | B2* | 9/2017 | McIntyre | A61N 1/36082 |
| 10,062,207 | B2* | 8/2018 | Huang | G06T 17/20 |
| 10,089,781 | B2* | 10/2018 | Huang | G06T 5/002 |
| 10,121,283 | B2* | 11/2018 | Huang | G06T 17/30 |
| 2003/0034971 | A1* | 2/2003 | Fujiwara | G06T 17/30 345/420 |
| 2005/0256686 | A1* | 11/2005 | Stabelfeldt | G06F 17/5018 703/6 |
| 2006/0139347 | A1* | 6/2006 | Choi | G06F 17/5018 345/419 |
| 2006/0265202 | A1* | 11/2006 | Muller-Fischer | G06F 17/5009 703/6 |
| 2008/0123927 | A1* | 5/2008 | Miga | G06T 7/344 382/131 |
| 2008/0246836 | A1* | 10/2008 | Lowe | G06T 15/20 348/46 |
| 2008/0259073 | A1* | 10/2008 | Lowe | G06T 15/20 345/419 |
| 2009/0284529 | A1* | 11/2009 | De Aguiar | G06T 13/40 345/420 |
| 2010/0074532 | A1* | 3/2010 | Gordon | G01B 11/25 382/203 |
| 2010/0085353 | A1* | 4/2010 | Zhou | G06T 17/00 345/419 |
| 2010/0189320 | A1* | 7/2010 | Dewaele | G06T 7/168 382/128 |
| 2010/0328308 | A1* | 12/2010 | Gamliel | G06T 17/20 345/420 |
| 2011/0106507 | A1* | 5/2011 | Lepage | G01V 11/00 703/2 |
| 2011/0169914 | A1* | 7/2011 | Lowe | G06T 15/20 348/43 |
| 2012/0002038 | A1* | 1/2012 | Furrer | A45D 31/00 348/129 |
| 2012/0053716 | A1* | 3/2012 | Bickel | G06F 17/50 700/98 |
| 2012/0281019 | A1* | 11/2012 | Tamstorf | G06T 3/0093 345/646 |
| 2013/0127836 | A1* | 5/2013 | Joshi | G06T 11/203 345/419 |
| 2013/0187919 | A1* | 7/2013 | Medioni | G06T 17/00 345/420 |
| 2014/0037161 | A1* | 2/2014 | Rucker | A61B 5/0033 382/128 |
| 2014/0046469 | A1* | 2/2014 | Bickel | G06F 17/50 700/106 |
| 2014/0334670 | A1* | 11/2014 | Guigues | G06T 7/251 382/103 |
| 2015/0216496 | A1* | 8/2015 | Lee | G06T 7/0012 600/425 |
| 2015/0278414 | A1* | 10/2015 | Zhou | G06F 17/5018 703/2 |
| 2015/0355158 | A1* | 12/2015 | Lander | G01N 33/24 702/2 |
| 2016/0000518 | A1* | 1/2016 | Thoranaghatte | G06F 3/017 703/11 |
| 2016/0292902 | A1* | 10/2016 | Milne | G06T 9/40 |
| 2016/0306390 | A1* | 10/2016 | Vertegaal | G06F 1/1666 |
| 2016/0321820 | A1* | 11/2016 | Ely | G06T 7/254 |
| 2016/0350904 | A1* | 12/2016 | Zhang | G06T 17/00 |

FOREIGN PATENT DOCUMENTS

| | | |
|---|---|---|
| CN | 101425188 | 5/2009 |
| CN | 101634618 | 1/2010 |
| CN | 103942377 | 7/2014 |
| CN | 105069826 | 11/2015 |
| JP | 2007-34724 | 2/2007 |

OTHER PUBLICATIONS

Nealen et al. ("Physically Based Deformable Models in Computer Graphics", EUROGRAPHICS 2005, pp. 1-24) (Year: 2005).*

Huang et al. (Consolidation of Unorganized Point Clouds for Surface Reconstruction, ACM, 2009, pp. 176:1-176:7) (Year: 2009).*

Barbic et al. (Interactive Editing of Deformable Simulations, ACM, 2012, pp. 70:1-70:8) (Year: 2012).*

Cao et al. (Point Cloud Skeletons via Laplacian-Based Contraction, 2010, IEEE, pp. 187-197) (Year: 2010).*

Wang et al. Fitting B-Spline Curves to Point Clouds by Curvature-Based Squared Distance Minimization, 2006, ACM, pp. 214-238) (Year: 2006).*

Bickel et al. (Design and Fabrication of Materials with Desired Deformation Behavior, 2010, ACM, pp. 63:1-63:10) (Year: 2010).*

International Search Report for PCT/CN2015/088126, dated May 18, 2016, 6 pages including English translation.

First Chinese Office Action and Search Report, dated Sep. 20, 2017 for counterpart Chinese patent application No. 201510530983.4, 12 pages (English language abstract enclosed).

Pan et al., "Three-dimensional Modeling and Motion Estimation of Elastic Articulated Objects from Image Contours" Journal of Nanjing University of Science and Technology (Natural Science), vol. 33 No. 2, Apr. 2009, pp. 220-224 (English language abstract enclosed).

Song Chao, "Research on Physically based Simulation of Elastic Deformation", Database Information technology series, China Doctoral Thesis, State Key Lab of CAD & CG, Department of Computer Science and Technology, Hangzhou China, 2008, vol. 8, 108 pages (English language abstract enclosed).

Longhua et al., "Survey on Points-Driven Computer Graphics", Journal of Computer-Aided Design & Computer Graphics, vol. 27, No. 8, Aug. 2015, pp. 1341-1353 (English language abstract enclosed).

* cited by examiner

//  METHOD AND DEVICE FOR ELASTIC OBJECT DEFORMATION MODELING

This application is a continuation of International Application No. PCT/CN2015/088126, filed on Aug. 26, 2015, which is hereby incorporated by reference in its entirety.

TECHNICAL FIELD

The present disclosure relates to the field of simulation and modeling, in particularly, to a method and device for deformation modeling.

BACKGROUND

In recent decades, the computer graphics technique is developed considerably, and the achievements have been widely applied to the fields such as film and television, game, virtual simulation, design and manufacturing. In addition to realistic geometric model and vivid rendering effect, motion with physical realism is an important and indispensable constituent part in the fields of film and television production and animation. However, in the conventional method, the over simplification of the mathematical model and the inaccurate parameters seriously damage the accuracy of the simulation result, and hinder the technique from being widely applied in the actual industrial fields.

The conventional method for modeling usually applies external forces with known magnitudes on different locations of the object by means of a force sensing device, obtains the deformed shapes under equilibrium with different external force conditions via a position tracking device, and finally fittings a stress-strain relation curve using a theoretical method such as machine learning or probability counting, etc. to obtain the mathematical physical model of the object. However, the motion model established using the existed method for modeling the deformation of the elastic object is not vivid enough.

SUMMARY OF THE DISCLOSURE

The embodiments of the present disclosure provide a method for elastic object deformation modeling. The method comprises:

acquiring a static point cloud of the elastic object and dynamic point cloud sequences during the deformation;

establishing a simulation tetrahedral mesh model for simulating the deformation of the elastic object according to the static point cloud;

driving the simulation tetrahedral mesh model to track the dynamic point cloud sequences, to obtain track deformation sequences of the simulation tetrahedral mesh model;

iteratively estimating material property coefficients and reference shape of the elastic object; performing the following operations in each iteration until the material property coefficient and its corresponding reference shape achieve a minimum positional deviation: obtaining a reference shape of the simulation tetrahedral mesh model corresponding to a current material property coefficient of the elastic object; driving the simulation tetrahedral mesh model to simulate the deformation of the elastic object from the same initial deformation according to the current material property coefficient and the reference shape; calculating a positional deviation between the simulation deformation sequences and the track deformation sequences; and updating the material property coefficients of the elastic object in a direction in which the positional deviation is decreased;

establishing a deformation model using the material property coefficient and its corresponding reference shape of the elastic object which can achieve minimum positional deviation.

The embodiments of the present disclosure further provide a device for elastic object deformation modeling, for establishing a vivid elastic object deformation model. The device comprises a processor configured to:

acquire a static point cloud of the elastic object and dynamic point cloud sequences during the deformation;

establish a simulation tetrahedral mesh model for simulating the deformation of the elastic object according to the static point cloud;

drive the simulation tetrahedral mesh model to track the dynamic point cloud sequences, to obtain deformation sequences of the simulation tetrahedral mesh model;

iteratively estimating material property coefficients and reference shape of the elastic object; performing the following operations in each iteration until the material property coefficient and its corresponding reference shape achieve a minimum positional deviation: obtaining a reference shape of the simulation tetrahedral mesh model corresponding to a current material property coefficient of the elastic object; driving the simulation tetrahedral mesh model to simulate the deformation of the elastic object from the same initial deformation according to the current material property coefficient and the reference shape; calculating a positional deviation between the simulation deformation sequences and the track deformation sequences; and updating the material property coefficients of the elastic object in a direction in which the positional deviation is decreased;

establishing a deformation model using the material property coefficient and its corresponding reference shape of the elastic object which can achieve minimum positional deviation.

The conventional technical solution applies the external forces with known magnitudes on different locations of the object by a force sensing device, obtains the deformed shape when the object reach equilibrium under different external forces via a position tracking device, and establishes a stress-strain relation curve, finally using a theoretical method such as machine learning or probability counting, etc. to obtain the mathematical physical model of the object to be measured for modeling. As compared with the above conventional technical solution, the embodiment of the present disclosure performs the tracking analysis and modeling of the point cloud sequences of the deformation of the elastic object depending a data driving method.

Specifically, at first, acquiring a static point cloud of the elastic object and dynamic point cloud sequences; secondly, establishing a simulation tetrahedral mesh model for simulating the deformation of the elastic object according to the static point cloud; next, driving the simulation tetrahedral mesh model to track the dynamic point cloud sequences, to obtain track deformation sequences of the simulation tetrahedral mesh model; next, iteratively estimating material property coefficients of the elastic object and reference shapes of the simulation tetrahedral mesh model corresponding to the material property coefficients of the elastic object; performing the following operations in each iteration until the material property coefficient and its corresponding reference shape under a minimum positional deviation are found: obtaining a reference shape of the simulation tetrahedral mesh model corresponding to a current material property coefficient of the elastic object; driving the simulation tetrahedral mesh model to simulate the deformation of the elastic object from the same initial deformation according to the current material property coefficient of the elastic object and the reference shape of the simulation tetrahedral mesh model corresponding to the current material property coefficient of the elastic object to obtain simulation deformation sequences of the simulation tetrahedral mesh model; calculating a positional deviation between the simulation deformation sequences and the track deformation sequences; and updating the material property coefficients of the elastic object in a direction in which the positional deviation is decreased; finally, establishing a deformation model using the material property coefficient and its corresponding reference shape of the elastic object which can achieve minimum positional deviation. The above method and device for modeling can establish a vivid elastic object deformation model.

BRIEF DESCRIPTION OF THE DRAWINGS

In order to more clearly describe the technical solutions in the embodiments of the present disclosure, the drawings to be used in the descriptions of the embodiments will be briefly introduced as follows. Obviously, the drawings in the following descriptions just illustrate some embodiments of the present disclosure, and a person skilled in the art can obtain other drawings from them without paying any creative effort. In which.

DETAILED DESCRIPTION OF THE EMBODIMENTS

In order to make the objectives, technical solutions and advantages of the embodiments of the present disclosure are clearer, the embodiments of the present disclosure will be further described in details as follows with reference to the drawings. Here the exemplary embodiments of the present disclosure and descriptions thereof are just used to explain, rather than limiting, the present disclosure.

Figure 1:
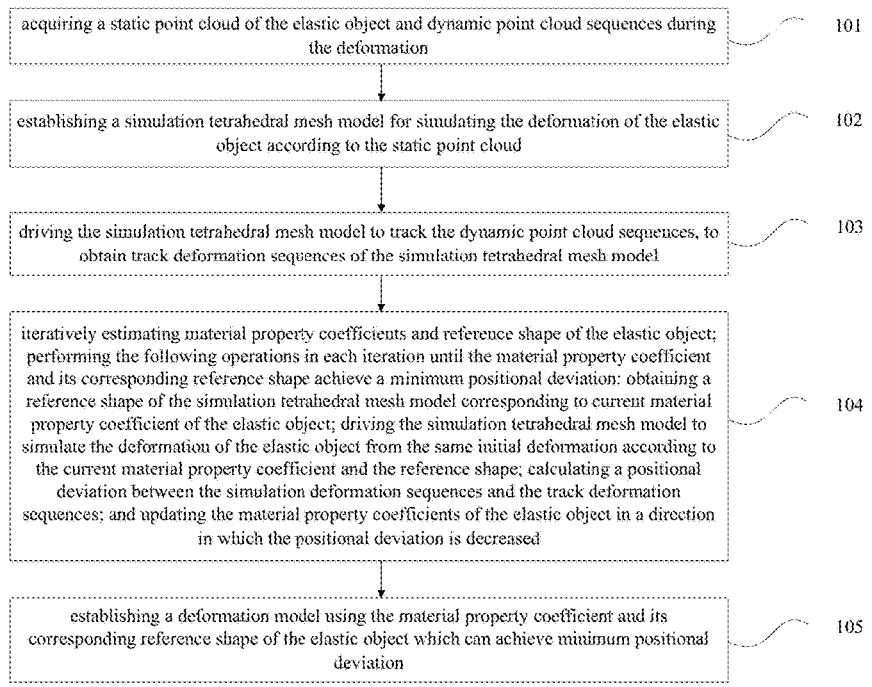
FIG. 1 is a flow diagram of a method for elastic object deformation modeling in an embodiment of the present disclosure.

FIG. 1 is a flow diagram of a method for elastic object deformation modeling in an embodiment of the present disclosure. As illustrated in FIG. 1, the method comprises the steps of:

step 101: acquiring a static point cloud of the elastic object and dynamic point cloud sequences during the deformation;

step 102: establishing a simulation tetrahedral mesh model for simulating the deformation of the elastic object according to the static point cloud;

step 103: driving the simulation tetrahedral mesh model to track the dynamic point cloud sequences, to obtain deformation sequences of the simulation tetrahedral mesh model;

step 104: iteratively estimating material property coefficients and reference shape of the elastic object; performing the following operations in each iteration until the material property coefficient and its corresponding reference shape achieve a minimum positional deviation: obtaining a reference shape of the simulation tetrahedral mesh model corresponding to current material property coefficient of the elastic object; driving the simulation tetrahedral mesh model to simulate the deformation of the elastic object from the same initial deformation according to the current material property coefficient and the reference shape; calculating a positional deviation between the simulation deformation sequences and the track deformation sequences; and updating the material property coefficients of the elastic object in a direction in which the positional deviation is decreased;

step 105: establishing a deformation model using the material property coefficient and its corresponding reference shape of the elastic object which can achieve minimum positional deviation.

A method for elastic object deformation modeling provided by the embodiment of the present disclosure firstly acquires a static point cloud and dynamic point cloud sequences of an elastic object; secondly, establishes a simulation tetrahedral mesh model for simulating the deformation of the elastic object according to the static point cloud; next, drives the simulation tetrahedral mesh model to track the dynamic point cloud sequences, to obtain track deformation sequences of the simulation tetrahedral mesh model; next, iteratively estimates material property coefficients and reference shapes of the elastic object; performs the following operations in each iteration until the material property coefficient and its corresponding reference shape under a minimum positional deviation are found: obtaining a reference shape of the simulation tetrahedral mesh model corresponding to the current material property coefficient of the elastic object; driving the simulation tetrahedral mesh model to simulate the deformation of the elastic object from the same initial deformation according to the current material property coefficient and the reference shape of the elastic object to obtain simulation deformation sequences of the simulation tetrahedral mesh model; calculating a positional deviation between the simulation deformation sequences and the track deformation sequences; and updating the material property coefficients of the elastic object in a direction in which the positional deviation is decreased; finally, establishing a deformation model using the material property coefficient and its corresponding reference shape of the elastic object which can achieve minimum positional deviation.

Next, the respective steps mentioned in the embodiment of the present disclosure will be described in details.

Figure 2:
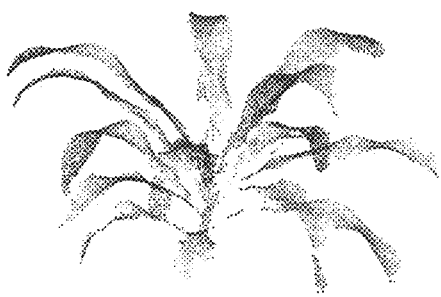
FIG. 2 is a schematic diagram of acquired static point cloud of an elastic object in an embodiment of the present disclosure.

In step 101, the static point cloud of the elastic object and the dynamic point cloud sequences during the deformation are acquired using three Kinect sensors. FIG. 2 is a schematic diagram of the acquired static point cloud of the elastic object and the acquired dynamic point cloud sequences during the deformation. Step 101 is a process of acquiring the static point cloud and the dynamic point cloud sequences of the elastic object.

Figure 3:
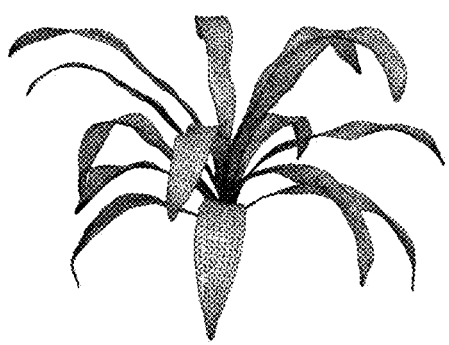
FIG. 3 is a schematic diagram of an established static surface mesh model of an elastic object in an embodiment of the present disclosure.
Figure 4:
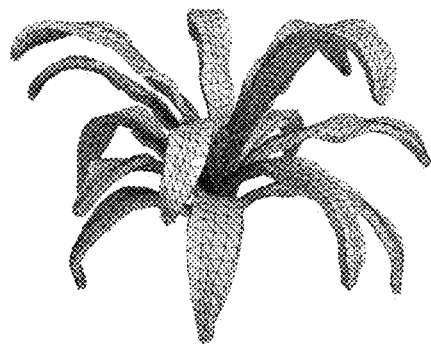
FIG. 4 is a schematic diagram of a simulation tetrahedral mesh model in an embodiment of the present disclosure.

In step 102, establishing a simulation tetrahedral mesh model for simulating the deformation of the elastic object according to the static point cloud include:

establishing a static surface mesh model of the elastic object according to the static point cloud; since the static surface mesh model is very accurate, it also may be referred to as a static fine surface mesh model, and FIG. 3 illustrates the static surface mesh model;

establishing the simulation tetrahedral mesh model for simulating the deformation of the elastic object according to the static surface mesh model; FIG. 4 is a schematic diagram of the simulation tetrahedral mesh model;

a vertex of the static surface mesh model is in a linear interpolation relationship with tetrahedral node coordinates contains the vertex in the simulation tetrahedral mesh model, and the interpolation coefficients are the barycenter coordinates of the tetrahedral.

In FIG. 3, the static surface mesh model has 15368 vertexes, and the corresponding simulation tetrahedral mesh model has 9594 nodes.

Step 102 is a process of establishing the simulation tetrahedral mesh model for simulating the deformation of the elastic object.

During implementation, firstly, a static surface mesh model of the object is created (as illustrated in FIG. 3). Next, the mesh of the static surface mesh model is transferred to a volumetric data generation tool TETGEN to export a relatively rough tetrahedral mesh for a physical simulation, which will also be used as a template for tracking the dynamic point cloud sequences (as illustrated in FIG. 4). In order to obtain position information of the fine mesh from the simulated tetrahedral elements, an embedding strategy is adopted, wherein any vertex of the static surface mesh model can be represented with linear interpolation of the tetrahedron node, and the interpolation coefficients are the barycenter coordinates of the tetrahedral.

In one embodiment, acquiring a static point cloud of the elastic object and dynamic point cloud sequences during the deformation comprises: acquiring all the dynamic point cloud sequences after the elastic object is deformed.

In step 103, driving the simulation tetrahedral mesh model to track the dynamic point cloud sequences, to obtain track deformation sequences of the simulation tetrahedral mesh model may comprise:

finding a maximum probability corresponding relation between dynamic point cloud and all nodes of the simulation tetrahedral mesh model after the elastic object is deformed;

applying a virtual external force to each node of the simulation tetrahedral mesh model according to the maximum probability corresponding relation, and driving each node of the simulation tetrahedral mesh model to track dynamic point cloud of the elastic object corresponding to the node, to obtain a position of each node of the deformed simulation tetrahedral mesh model;

finding a position of each vertex of the deformed static surface mesh model, according to the linear interpolation relation, and the position of each node of the deformed simulation tetrahedral mesh model;

calculating a difference between the position of each vertex of the deformed static surface mesh model and a position of the dynamic point cloud corresponding to the vertex after the elastic object is deformed, and obtaining the track deformation of the simulation tetrahedral mesh model until the difference is smaller than a predetermined value.

In one embodiment, the difference is smaller than the predetermined value may include: a distance between each vertex of the deformed static surface mesh model and the dynamic point cloud corresponding to the vertex after the elastic object is deformed is smaller than a predetermined distance, or an attractive force between each vertex of the deformed static surface mesh model and the dynamic point cloud corresponding to the vertex after the elastic object is deformed is smaller than a predetermined attractive force.

Step 103 is a process of driving the simulation tetrahedral mesh model for deformation and tracking the deformation of the elastic object.

During implementation, step 103 is a probability tracking method based on physics. The motion tracking needs to process the noised point cloud data, and consider issues of occlusion, fast motion and large-scale deformation. Thus, we convert the deformation tracking into an issue of Maximum A Posteriori (MAP), and performing an iterative calculation using an Expectation Maximization (EM) method: (step E) seeking an most probably corresponding relationship according to the current point cloud and the node position; (step M) moving the node position so that the above corresponding relation is a maximum likelihood estimation.

Next, the tracking process will be described in details.

Assuming that $c=c_{1:N}$, $1 \le n \le N$ represents a coordinate of a point in the acquired point cloud, and $s=s_{1:k}$, $1 \le k \le K$ represents a position of a mesh node. Our task is to calculate the position s matched in shape based on the given point cloud c. The relation between the point in the point cloud and the point in the mesh is unknown, and taken as a latent variable $Z_{kn}$ that indicates that an observation point $c_n$ may come from probability of a node $S_k$; assuming that $c_n$ meets a normal distribution, specifically $c_n \sim N(s_k, \Sigma_k)$, and a covariance matrix is $\Sigma_k = \sigma^2 I$, wherein $\sigma$ is a variance and I is a unit matrix. The mesh deformation tracking matched point cloud may be represented as an issue of MAP:

$$s = \operatorname*{argmax}_{s} p(s \mid c);$$

In that case, a calculation is made using the EM algorithm. In step E, a lowest boundary log p(s,c) of a total logarithmic joint probability is found based on an expectation of the latent variable $p(Z_{kn}|s, c)$ (p represents a probability distribution); and in step M, the lowest boundary in step E is maximized by adjusting the vertex position of the tetrahedral mesh:

$$s = \operatorname*{argmax}_{s} [\log p(c \mid s) + \log p(s)];$$

The second item in the above equation reflects the potential energy of the deformed object model, thus an optimal calculation can be performed in a manner of physical simulation. A virtual force is added to each node:

$$f_k \eta \Sigma_n p(z_{kn}) \Sigma_k^{-1}(c_n - s_k);$$

wherein, $\eta$ is a proportionality coefficient of the virtual force;

the virtual force acts as an external force to drive the mesh deform to match the shape of the point cloud, and the motion equation is:

$$M\ddot{x} + D\dot{x} + RK(R^T x - X) = \text{fext};$$

herein, the co-rotated linear finite element model to simulate the deformed object, M is a mass matrix, $D = \alpha M + \beta K$ is a Rayleigh damping matrix, $\alpha$ and $\beta$ are two coefficients which correspond to Rayleigh damping, R is a rotation matrix obtained by a polar decomposition of the deformation gradient, K is a stiffness matrix, x is the shape of the deformed simulation tetrahedral mesh model, X is a reference shape of the simulation tetrahedral mesh model, and fext is external forces. The physical simulation part is encapsulated with a third party library VEGA FEM. In order to accelerate the calculation, herein an embedding strategy is adopted, i.e., in each iteration, the external force is mapped to the simulation tetrahedral mesh model having a small number of nodes to simulate the tracking motion, and then the nodal displacement is interpolated back into the vertex of the static surface mesh model. The motion tracking process is to apply the external force simulation until the EM iteration converges.

With respect to the aforementioned motion tracking part, in the conventional technical solution, the requirement of the point cloud data is high, and a large-scale deformation and the situation where there are many noise interference items cannot be processed; thirdly, the mesh topology may go out of form since the physical constraints are not fused in the matching result. As can be seen from the description of step 103, the technical solution of the present disclosure uses the probability-based tracking algorithm to find the probability corresponding relations between the dynamic point cloud after the elastic object is deformed and all nodes of the simulation tetrahedral mesh model, and drives the mesh deformation of the simulation tetrahedral mesh model by the physical engine. At the same time, the physical constraints (constraints satisfying the above equations and formulas) are fused in the matching result and the mesh topology will not go out of form. Thus the operation speed is faster, the tracking effect is better, and the robustness is stronger. Step 103 can achieve low noise of the point cloud data establishing the elastic object deformation model, and can solve the problems of occlusion, fast motion and large-scale deformation.

In step 104, obtaining a reference shape of the simulation tetrahedral mesh model corresponding to a current material property coefficient of the elastic object may comprise:

verifying whether the current material property coefficient and the reference shape of the simulation tetrahedral mesh model corresponding to the current material property coefficient of the elastic object satisfy a physical static equilibrium equation.

During implementation, step 104 comprises a parameter estimation part and a reference shape optimization part, in which an unknown static material property coefficient $p=(E, v, \alpha, \beta)$ and corresponding reference shape X can be estimated through a data driving method, wherein E is a Young modulus, v is a Poisson ratio, and $\alpha$ and $\beta$ are two coefficients which correspond to Rayleigh damping. The calculation may be represented as a space-time optimization. The target equation F as follows measures a positional deviation between the simulation deformation sequences and the track deformation sequences:

$$\min_{p,X} F(p, X) = \sum_t \Box x_t - \hat{x}_t \Box^2;$$

wherein, $\hat{x}_t$ is an output result of the tracking (i.e., track deformation sequences), and $x_t$ is a position of the simulation result (i.e., simulation deformation sequences) in the $t^{th}$ frame. The space-time optimization is of highly dimension and non-linear, and the objective function is non-convex, which cannot be effectively solved by the conventional method. Thus, a novel divide-and-conquer strategy is proposed to alternatively and iteratively optimize X and p. That is to say, the optimal material property coefficient and reference shape (i.e., a material property coefficient under a minimum positional deviation and a reference shape of the simulation tetrahedral mesh model corresponding to the material property coefficient) can be found through the method.

In each iteration of the algorithm, firstly an optimized estimation of the reference shape is performed to ensure that the current material property coefficient p and the corresponding reference shape X thereto satisfy the constraints of the physical static equilibrium, thus the step fuses the physical constraints. Next, the standard downward searching method is used to update the material property coefficient p in a direction in which the trajectory deviation is decrease. The strategy is performed cyclically until the convergence is enough.

In one embodiment, performing the following operations in each iteration until the material property coefficient under a minimum positional deviation and a reference shape of the simulation tetrahedral mesh model corresponding to the material property coefficient under the minimum positional deviation are found comprises: using the following target equation to obtain a shape corresponding to a minimum force residual error as the reference shape of the simulation tetrahedral mesh model:

$$\min F(X) = \min_X \Box RK(R^T x^s - X) - Mg\Box^2;$$

wherein, R is a rotation matrix, K is a stiffness matrix, $x^s$ is a static shape of the elastic object, X is a reference shape of the simulation tetrahedral mesh model, M is a mass of the elastic object, and g is an acceleration of gravity.

During implementation, in order to reconstruct a plausible simulation motion, the reference shape and the static shape of the object model should be distinguished from each other. The reference shape is what the object looks like without any external force. Obvious sagging artifact can be observed when the simulation is triggered on if the static shape is used as reference shape for simplicity. For example in the deformation of a plant, any leaf of the plant will firstly have a slight motion of drooping under the effect of gravity, and the simulation motion is certainly unreal. The inventor considers the problem and adopts the above target equation. The calculated resultant force residual error is applied to the simulation tetrahedral mesh model to obtain the reference shape of the simulation tetrahedral mesh model. By applying the method, a realistic simulation model of the deformation of the elastic object can be generated.

The specific derivation process is as follows: as the gravity of the object is the only reason that causes the two different shapes, we remove the items of acceleration and speed to simplify the motion equation to optimize the reference shape of the model; assuming that $x^s$ represents the static shape of the object, the simplified force balance equation is:

$$RK(R^T x^s - X) = Mg$$

In order to obtain the minimum force residual, the objective function is:

$$\min F(X) = \min_X \|RK(R^T x^s - X) - Mg\|^2$$

The current force residual is applied to the simulation model as a virtual external force, so as to update the reference shape of the model through simulation. The simulation is continuously performed until the force residual error is small enough and the simulation is in a stable state. As compared with the conventional optimization method, this method has the advantages of robustness and rapidness, and the deformation meets the physical constraints.

In one embodiment, calculating a Jacobian matrix of the virtual elastic force applied to each node of the simulation tetrahedral mesh model relative to the reference shape of the simulation tetrahedral mesh model need to calculate the Jacobian matrix is:

$$\frac{\partial f}{\partial X_{ij}} = V'RB^T EB(Rx^s - X) + VR'B^T EB(Rx^s - X) +$$
$$VRB'^T EB(Rx^s - X) + VRB^T EB'(Rx^s - X) + VRB^T EB(R'x^s - e_{3(j-1)+i});$$

wherein, f is a virtual elastic force applied to each node of the simulation tetrahedral mesh model, $X_{ij}$ is a position of the $i^{th}$ node in direction j in the reference shape of the simulation tetrahedral mesh model, $x^s$ is a static shape of the elastic object, X is the reference shape of the simulation tetrahedral mesh model, V is a volume of each tetrahedral element of the simulation tetrahedral mesh model, E is a constant matrix related to the material property of the elastic object, and R is a rigid rotation matrix representing each tetrahedral element of the simulation tetrahedral mesh model.

That is to say, in order to achieve a rapid and stable simulation to solve the above problem of optimization, we adopt an implicit solving method. In that case, a Jacobian matrix $$\frac{\partial f}{\partial X_{ij}}$$

of the elastic force relative to the reference shape should be calculated.

The detailed derivation process is given as follows: assuming that the node position of the non-deformed tetrahedral mesh is $[x_1^T, x_2^T, x_3^T, x_4^T]^T \in \square^{12}$, and the node position of the reference shape is $X = [X_1^T, X_2^T, X_3^T, X_4^T]^T \in \square^{12}$. The elastic force of the co-rotated linear finite element model is:

$$f = VRB^T E(R^T x - X);$$

wherein, V is a volume of a tetrahedral element, E is a 6×6 constant matrix and related to the elastic property of the material. The matrix R=diag(R,R,R,R) is a block diagonal matrix; R is a rigid rotation matrix representing each tetrahedral element and it is obtained by a polar decomposition of the deformation gradient of the model, i.e., F=RS, wherein S is a symmetric matrix. For a tetrahedral element, F is a matrix $$\overline{F} = V_s V_m^{-1} = V_s B_m;$$

The upper left matrix is a 3×3 sub-block matrix, wherein $$V_s = \begin{bmatrix} x_1 & x_2 & x_3 & x_4 \\ 1 & 1 & 1 & 1 \end{bmatrix}; V_m = \begin{bmatrix} X_1 & X_2 & X_3 & X_4 \\ 1 & 1 & 1 & 1 \end{bmatrix}$$

and $B_m = V_m^{-1}$ are all 4×4 matrixes.

The 6×12 matrix B only depends on X, and its interior is constructed by $B_m$, and herein $B_{ij}$ represents an element in the $i^{th}$ row and the $j^{th}$ column in $B_m$:

$$B = [\overline{B}_1 \ \overline{B}_2 \ \overline{B}_3 \ \overline{B}_4]; \overline{B}_i = \begin{bmatrix} B_{i1} & 0 & 0 \\ 0 & B_{i2} & 0 \\ 0 & 0 & B_{i3} \\ B_{i2} & B_{i1} & 0 \\ 0 & B_{i3} & B_{i2} \\ B_{i3} & 0 & B_{i1} \end{bmatrix};$$

The required Jacobian matrix is $$K = \frac{\partial f}{\partial X};$$

$k_q$ represents the $q^{th}$ column of K, i.e., a partial differential of the $q^{th}$ column of K, and actually a constituent part of the $i^{th}$ item of node j, and herein represented with $X_{ij}$. By applying the chain rule, we obtain:

$$\frac{\partial f}{\partial X_{ij}} = V'RB^T EB(Rx - X) + VR'B^T EB(Rx - X) +$$
$$VRB'^T EB(Rx - X)VRB^T EB'(Rx - X) + VRB^T EB(R'x - e_{3(j-1)+i});$$

Herein the single quotation mark (') means that the partial differential $$\frac{\partial}{\partial X_{ij}}, e_q \in \square^{12}$$

is a standard basis of the $q^{th}$ item of $\square^{12}$. The derivation result of each item is as follows:

$$V' = \frac{\partial V}{\partial X_{ij}} = \frac{\partial V}{\partial (V_m)_{ij}} = VB_{ji}; B' = [\overline{B}_1' \ \overline{B}_2' \ \overline{B}_3' \ \overline{B}_4'];$$

$$\overline{B}_k' = \frac{\partial \overline{B}_k}{\partial X_{ij}} = -\begin{bmatrix} B_{ki}B_{j1} & 0 & 0 \\ 0 & B_{ki}B_{j2} & 0 \\ 0 & 0 & B_{ki}B_{j3} \\ B_{ki}B_{j2} & B_{ki}B_{j1} & 0 \\ 0 & B_{ki}B_{j3} & B_{ki}B_{j2} \\ B_{ki}B_{j3} & 0 & B_{ki}B_{j1} \end{bmatrix}$$

The calculation of R' is more complex. By still applying the chain rule, we obtain:

$$R' = \frac{\partial R}{\partial X_{ij}} \sum_{k,l} \frac{\partial R}{\partial F_{kl}} \frac{\partial F_{kl}}{\partial X_{ij}};$$

Finally, the derivation of the second item in the right of the above equation is:

$$\overline{F}' = \frac{\partial \overline{F}}{\partial (V_m)_{ij}} = V_s \frac{\partial B_m}{\partial (V_m)_{ij}} = -V_s \begin{bmatrix} B_{1i}B_{j1} & B_{1i}B_{j2} & B_{1i}B_{j3} & B_{1i}B_{j4} \\ B_{2i}B_{j1} & B_{2i}B_{j2} & B_{2i}B_{j3} & B_{2i}B_{j4} \\ B_{3i}B_{j1} & B_{3i}B_{j2} & B_{3i}B_{j3} & B_{3i}B_{j4} \\ B_{4i}B_{j1} & B_{4i}B_{j2} & B_{4i}B_{j3} & B_{4i}B_{j4} \end{bmatrix};$$

$$\frac{\partial F_{kl}}{\partial X_{ij}} = \frac{\partial \overline{F}_{kl}}{\partial (V_m)_{ij}} = (\overline{F}')_{kl}.$$

By applying the reference shape for a deformation simulation with gravity as the only external force, a very accurate static shape can be obtained, which is substantially consistent with the acquired static shape. As to the parameter estimation part, the prior art generally considers that the reference shape of the object model is known, or the reference shape is equivalent to the static shape, and this analysis result is certainly inaccurate after the simplification. The technical solution of the present disclosure can simultaneously optimally estimate physical parameters of the object model and corresponding reference shape.

In one embodiment, estimating the material property coefficients of the elastic object comprises:

selecting a plurality of nodes from different positions in the simulation tetrahedral mesh model as control points;

estimating different material property coefficients of the control points at different positions according to a material distribution property of the elastic object;

calculating material property coefficients of other nodes of the simulation tetrahedral mesh model according to a linear interpolation algorithm and the different material property coefficients of the control points at different positions.

During implementation, the above method is employed to estimate the material property coefficients of the heterogeneous materials, respectively, thus the mathematical physical model of the heterogeneous materials can be generated, so that the established simulation model is more realistic.

Figure 5:
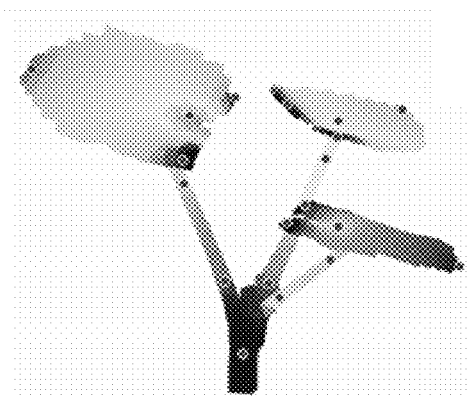
FIG. 5 is a schematic diagram of placing control points of a plant model along the stem in an embodiment of the present disclosure.

Specifically, a real motion trajectory of the elastic object is required to estimate the elastic material parameter and the damping coefficient. By giving an appropriate material distribution and the same initial position condition to the model, the same motion can be reconstructed by simulation. Considering that the reference shape can be obtained by calculating in the above method separately, the previous target equation can be rewritten as:

$$f(p) = \sum_{t,k} \| x_{tk} - \hat{x}_{tk} \|^2;$$

t is a serial number of a frame, and k is a serial number of a node. In order to minimize F(p), a simplex optimization method without a gradient may be used. In addition, since the model of a single material cannot well and really restore the deformation of the object, the concept of control point is introduced to solve the problem. By specifying different material properties of the control points, heterogeneous distributed material properties are obtained for other nodes of the model by linear interpolation. As illustrated in FIG. 5, regarding a plant model, the control points are placed in a rachis direction, and the interpolation weight is represented with a normalized rachis distance. Regarding a generated dinosaur model, the control points are assumed as being assigned to different positions, and the interpolation weight is controlled with a bi-harmonic function.

In one embodiment, obtaining an initial material property coefficient of the elastic object by:

selecting a first principal mode from a plurality of deformation modes during the deformation of the elastic object;

determining a vibration frequency corresponding to the first principal mode;

obtaining the initial material property coefficient of the elastic object according to a matching degree between the vibration frequency corresponding to the first principal mode and an actually acquired vibration frequency.

The "principal mode" is a vibration mode corresponding to the minimum eigenvalue.

During implementation, since the target function F(p) usually includes local minimum, an appropriate initial parameter is crucial important for the convergence of optimization. Namely, an optimum value is given when the material property coefficient is initially estimated, which is beneficial to the subsequent quick calculation and improve the modeling efficiency. Specifically, a novel strategy is proposed to obtain an appropriate initial material property coefficient through a modal analysis and a coordinate descent method.

In the modal analysis, a small deformation replacement $u=x-X\in\Box^n$ is linearized into $u=\Phi z$, wherein each column of $\Phi=[\Phi_1, \Phi_2, \ldots, \Phi_k]$ represents a deformation mode. $K\Phi i=\lambda_i M\Phi i$ can be obtained through a generalized eigenvalue decomposition. An eigenvector corresponding to a small eigenvalue is usually taken as a basis to establish a dimension-decreasing mode coordinate system $z\in\Box^k$, $k\ll 3n$. $\sqrt{\lambda_i}$ is corresponding to a natural frequency of each mode.

During the eigenvalue decomposition, the Young modulus E will influence the vibration frequency $\sqrt{\lambda_i}$. In an intuitive understanding, the vibration frequency of the object decreases when the material is softer.

The real displacement is projected into corresponding mode to obtain a real vibration frequency. The frequency difference should decrease if the estimated Young modulus is closer to the real reference value. Herein the material parameters are orderly updated in a coordinate descent method. During each iteration, a linear search is performed based on the degree of sensitivity of the variable change to the target function value change.

Two real models (cup mat and hanger) are additionally used to verify the measurement accuracy of our invention, and our measured Young modulus are 7.0e6 and 5.6e6, respectively. The results are compared with those of a real object under static force and dynamic deformation. The experimental results verify the feasibility of the embodiment of the present disclosure, and the measurement results have a high accuracy.

Figure 6:
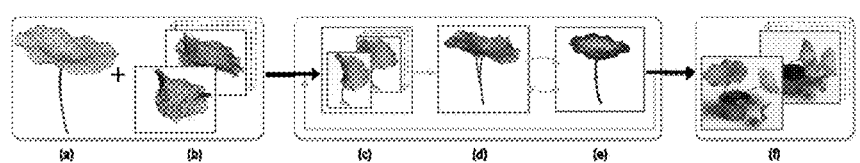
FIG. 6 is a schematic diagram when an elastic object deformation is modeled in an embodiment of the present disclosure.

FIG. 6 is a schematic diagram of modeling a deformation of an elastic object in an embodiment of the present disclosure. As illustrated in FIG. 6, firstly a static shape and dynamic point cloud motion sequences constructing an elastic object are acquired. Next, the core of the system, i.e., an alternative and iterative optimization strategy, performs a deformation tracking and a parameter estimation by turns, and the result of each iterative operation is that another part of effect can be obviously improved. The static fine model is taken as a tracking template mesh, and the system employs a probability tracking algorithm based on physics to drive the mesh deformation to register each frame of point cloud, and outputs the node position of each frame in the tetrahedral mesh. Next, the parameter estimation part optimally estimates the material property coefficient, the damping coefficient and the reference shape of the object model simultaneously. Herein the reference shape is the original shape of the object model without being effected by any external force including gravity. Therefore, the reference shape of the object should be different from the static shape influenced by gravity. The divide-and-conquer strategy is adopted at the optimization part, and after initial estimation physical parameters are given, the current reference shape of the model is obtained according to the static equilibrium equation; next, a forward simulation is performed using this group of materials and reference shape data to obtain motion sequences under the same initial deformation condition; and a difference between the shape of the motion sequences and the tracking result is calculated as an evaluation criterion of the group of parameters. An optimum value is found after multiple iterations, and finally, the system generates a set of simulation models realistically interactive with each other.

Based on the same invention conception, the embodiments of the present disclosure further provide a device for modeling of a deformation of an elastic object as described in the following embodiment. Since the principle of a device for modeling of a deformation of an elastic object is similar to that of a method for modeling of a deformation of an elastic object, please refer to the implementation of a method for modeling of a deformation of an elastic object for that of a device for modeling of a deformation of an elastic object, and the repetitive contents are omitted. The term "unit" or "module" used below can implement a combination of software and/or hardware having predetermined functions. Although the device described in the following embodiments is implemented preferably with software, the implementation with hardware, or a combination of software and hardware is also possible and conceivable.

Figure 7:
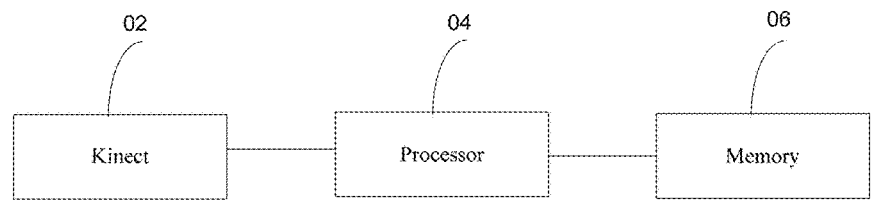
FIG. 7 is a structure diagram of a device for elastic object deformation modeling in an embodiment of the present disclosure.

FIG. 7 is a structure diagram of a device for elastic object deformation modeling in an embodiment of the present disclosure. As illustrated in FIG. 7, the device comprises a processor 04 configured to:

acquire a static point cloud of the elastic object and dynamic point cloud sequences during the deformation;

establish a simulation tetrahedral mesh model for simulating the deformation of the elastic object according to the static point cloud;

drive the simulation tetrahedral mesh model to track the dynamic point cloud sequences, to obtain track deformation sequences of the simulation tetrahedral mesh model;

iteratively estimate material property coefficients and reference shapes of the elastic object; perform the following operations in each iteration until the material property coefficient and its corresponding reference shape under a minimum positional deviation are found: obtaining a reference shape of the simulation tetrahedral mesh model corresponding to a current material property coefficient of the elastic object; driving the simulation tetrahedral mesh model to simulate the deformation of the elastic object from the same initial deformation according to the current material property coefficient and the reference shape; calculating a positional deviation between the simulation deformation sequences and the track deformation sequences; and updating the material property coefficients of the elastic object in a direction in which the positional deviation is decreased;

establishing a deformation model using the material property coefficient and its corresponding reference shape of the elastic object which can achieve minimum positional deviation.

During implementation, as illustrated in FIG. 7, the device for modeling of the deformation of the elastic object in the embodiment of the present disclosure may further comprise:

three motion sensing periphery external devices Kinects 02 for acquiring the static point cloud of the elastic object and the dynamic point cloud sequences during the deformation, and providing the acquired data to the processor 04; of course, the above data may also be acquired using a camera;

a memory 06 for storing the acquired static point cloud of the elastic object and the acquired dynamic point cloud sequences during the deformation, or storing the dynamic point cloud sequences, the simulation deformation sequences, the established elastic object deformation model, etc.

In one embodiment, the processor is further configured to, when establishing the simulation tetrahedral mesh model, establish a static surface mesh model of the elastic object according to the static point cloud; establish the simulation tetrahedral mesh model for simulating the deformation of the elastic object according to the static surface mesh model; wherein a vertex of the static surface mesh model is in a linear interpolation relationship with tetrahedral node coordinates contains the vertex in the simulation tetrahedral mesh model, and the interpolation coefficients are the barycenter coordinates of the tetrahedral.

In one embodiment, the processor is further configured to:

when acquiring a static point cloud of the elastic object and a dynamic point cloud sequences during the deformation, acquire all the dynamic point cloud sequences after the elastic object is deformed;

when driving the simulation tetrahedral mesh model to track the dynamic point cloud sequences, to obtain track deformation sequences of the simulation tetrahedral mesh model, find a maximum probability corresponding relationship between dynamic point cloud and all nodes of the simulation tetrahedral mesh model after the elastic object is deformed; apply a virtual external force to each node of the simulation tetrahedral mesh model according to the maximum probability corresponding relationship, and drive each node of the simulation tetrahedral mesh model to track dynamic point cloud sequences of the elastic object corresponding to the node, to obtain a position of each node of the deformed simulation tetrahedral mesh model; find a position of each vertex of the deformed static surface mesh model, according to the linear interpolation relation and the position of each node of the deformed simulation tetrahedral mesh model; calculate a difference between the position of each vertex of the deformed static surface mesh model and a position of the dynamic point cloud sequences corresponding to the vertex after the elastic object is deformed, and obtain the track deformation sequences of the simulation tetrahedral mesh model until the difference is smaller than a predetermined value.

In one embodiment, the difference is smaller than the predetermined value may include: a distance between each vertex of the deformed static surface mesh model and the dynamic point cloud corresponding to the vertex after the elastic object is deformed is smaller than a predetermined distance, or an attractive force between each vertex of the deformed static surface mesh model and the dynamic point cloud sequences corresponding to the vertex after the elastic object is deformed is smaller than a predetermined attractive force.

In one embodiment, the processor is further configured to, when obtaining a reference shape of the simulation tetrahedral mesh model corresponding to a current material property coefficient of the elastic object, verify whether the current material property coefficient and the reference shape of the simulation tetrahedral mesh model corresponding to the current material property coefficient of the elastic object satisfy a physical static equilibrium equation.

In one embodiment, the processor is further configured to, obtain an initial material property coefficient of the elastic object by:

selecting a first principal mode from a plurality of deformation modes during the deformation of the elastic object;

determining a vibration frequency corresponding to the first principal mode;

obtaining the initial material property coefficient of the elastic object according to a matching degree between the vibration frequency corresponding to the first principal mode and an actually acquired vibration frequency.

In one embodiment, the processor is further configured to, when performing the following operations in each iteration until the material property coefficient under a minimum positional deviation and a reference shape of the simulation tetrahedral mesh model corresponding to the material property coefficient under the minimum positional deviation are found, using the following target equation to obtain a shape corresponding to a minimum resultant force residual error as the reference shape of the simulation tetrahedral mesh model:

$$\min F(X) = \min_{X} \Box RK(R^T x^s - X) - Mg \Box^2;$$

wherein, R is a rotation matrix, K is a stiffness matrix, $x^s$ is a static shape of the elastic object, X is a reference shape of the simulation tetrahedral mesh model, M is a mass of the elastic object, and g is an acceleration of gravity;

calculate a Jacobian matrix of the virtual elastic force applied to each node of the simulation tetrahedral mesh model relative to the reference shape of the simulation tetrahedral mesh model; the Jacobian matrix is:

$$\frac{\partial f}{\partial X_{ij}} = V'RB^T EB(Rx^s - X) + VR'B^T EB(Rx^s - X) +$$
$$VRB'^T EB(Rx^s - X) + VRB^T EB'(Rx^s - X) + VRB^T EB(R'x^s - e_{3(j-1)+i});$$

wherein, f is a virtual elastic force applied to each node of the simulation tetrahedral mesh model, $X_{ij}$ is a position of the $i^{th}$ node in direction j in the reference shape of the simulation tetrahedral mesh model, $x^s$ is a static shape of the elastic object, X is the reference shape of the simulation tetrahedral mesh model, V is a volume of each tetrahedral element of the simulation tetrahedral mesh model, E is a constant matrix related to the material property of the elastic object, and R is a rigid rotation matrix representing each tetrahedral element of the simulation tetrahedral mesh model.

In one embodiment, the processor is further configured to, when estimating the material property coefficients of the elastic object, select a plurality of nodes from different positions in the simulation tetrahedral mesh model as control points; estimate different material property coefficients of the control points at different positions according to a material distribution property of the elastic object; and calculate material property coefficients of other nodes of the simulation tetrahedral mesh model according to a linear interpolation algorithm and the different material property coefficients of the control points at different positions.

The method for elastic object deformation modeling provided by the embodiments of the present disclosure can achieve the following beneficial technical effects:

1) The experimental acquisition platform can be easily built, and the prices of the devices are fair without any additional cost.

2) The motion reconstruction meets the physical constraints, can process a large-scale deformation, and has high fault tolerance and robustness for noises and data.

3) The parameter estimation is quick and high-efficient, and a divide-and-conquer strategy is adopted to calculate the physical parameters and the reference shapes simultaneously, so that the parameter estimation and the subsequent simulation are more accurate and vivid.

A person skilled in the art shall understand that the embodiments of the present disclosure can be provided as a method, a system or a computer program product. Therefore, the present disclosure can take the form of a full hardware embodiment, a full software embodiment, or an embodiment with combination of software and hardware aspects. Moreover, the present disclosure can take the form of a computer program product implemented on one or more computer usable storage mediums (including, but not limited to, a magnetic disc memory, CD-ROM, optical storage, etc.) containing therein computer usable program codes.

The present disclosure is described with reference to a flow diagram and/or block diagram of the method, device (system) and computer program product according to the embodiments of the present disclosure. It shall be understood that each flow and/or block in the flow diagram and/or block diagram and a combination of the flow and/or block in the flow diagram and/or block diagram can be realized by the computer program instructions. These computer program instructions can be provided to a general computer, a dedicated computer, an embedded processor or a processor of other programmable data processing device to generate a machine, such that the instructions performed by the computer or the processor of other programmable data processing devices generate the device for implementing the function designated in one flow or a plurality of flows in the flow diagram and/or a block or a plurality of blocks in the block diagram.

These computer program instructions can also be stored in a computer readable memory capable of directing the computer or other programmable data processing devices to operate in a specific manner, such that the instructions stored in the computer readable memory generate a manufactured article including an instruction device that implements the function(s) designated in one flow or a plurality of flows in the flow diagram and/or a block or a plurality of blocks in the block diagram.

These computer program instructions can also be loaded onto the computer or other programmable data processing devices, such that a series of operation steps is executed on the computer or other programmable devices to generate the processing realized by the computer, therefore the instructions executed on the computer or other programmable devices provide the steps for implementing the function designated in one flow or a plurality of flows in the flow chart and/or a block or a plurality of blocks in the block diagram.

The above are only the preferable embodiments of the present disclosure, and are not used for limiting the present disclosure. For a person skilled in the art, the embodiments of the present disclosure can be modified and changed variously. Any modification, equivalent substitutions and improvements within the spirit and principle of the present disclosure shall be contained in the protection scope of the present disclosure.

The invention claimed is:

1. A method for elastic object deformation modeling, comprising:

acquiring a static point cloud of the elastic object and dynamic point cloud sequences during the deformation;

establishing a simulation tetrahedral mesh model for simulating the deformation of the elastic object according to the static point cloud;

driving the simulation tetrahedral mesh model to track the dynamic point cloud sequences, to obtain track deformation sequences of the simulation tetrahedral mesh model;

iteratively estimating material property coefficients and reference shape of the elastic object; performing the following operations in each iteration until the material property coefficient and its corresponding reference shape achieve a minimum positional deviation: obtaining a reference shape of the simulation tetrahedral mesh model corresponding to a current material property coefficient of the elastic object; driving the simulation tetrahedral mesh model to simulate the deformation of the elastic object from the same condition with initial deformation of track deformation sequences according to the current material property coefficient and the reference shape of the elastic object to obtain simulation deformation sequences of the simulation tetrahedral mesh model; calculating a positional deviation between the simulation deformation sequences and the track deformation sequences; and updating the material property coefficients of the elastic object in a direction in which the positional deviation is decreased;

establishing a deformation model using the material property coefficient and its corresponding reference shape of the elastic object which can achieve minimum positional deviation;

establishing a simulation tetrahedral mesh model for simulating the deformation of the elastic object according to the static point cloud comprises:

establishing a static surface mesh model of the elastic object according to the static point cloud;

establishing the simulation tetrahedral mesh model for simulating the deformation of the elastic object according to the static surface mesh model;

a vertex of the static surface mesh model is in a linear interpolation relationship with tetrahedral node coordinates contains the vertex in the simulation tetrahedral mesh model, and interpolation coefficients of the linear interpolation relationship are the barycenter coordinates of the tetrahedral;

acquiring a static point cloud of the elastic object and dynamic point cloud sequences during the deformation comprises: acquiring all the dynamic point cloud sequences after the elastic object is deformed;

driving the simulation tetrahedral mesh model to track the dynamic point cloud sequences, to obtain track deformation sequences of the simulation tetrahedral mesh model comprises:

finding a maximum probability corresponding relation between the dynamic point cloud sequences and all nodes of the simulation tetrahedral mesh model after the elastic object is deformed;

applying a virtual external force to each node of the simulation tetrahedral mesh model according to the maximum probability corresponding relationship, and driving each node of the simulation tetrahedral mesh model to track dynamic point cloud sequences of the elastic object corresponding to the node, to obtain a position of each node of the deformed simulation tetrahedral mesh model;

finding a position of each vertex of the deformed static surface mesh model, according to the linear interpolation relationship, and the position of each node of the deformed simulation tetrahedral mesh model;

calculating a difference between the position of each vertex of the deformed static surface mesh model and a position of the dynamic point cloud sequences corresponding to the vertex after the elastic object is deformed, and obtaining the track deformation sequences of the simulation tetrahedral mesh model until the difference is smaller than a predetermined value.

2. The method for elastic object deformation modeling according to claim 1, wherein the difference is smaller than the predetermined value comprises: a distance between each vertex of the deformed static surface mesh model and the dynamic point cloud sequences corresponding to the vertex after the elastic object is deformed is smaller than a predetermined distance, or an attractive force between each vertex of the deformed static surface mesh model and the dynamic point cloud sequences corresponding to the vertex after the elastic object is deformed is smaller than a predetermined attractive force.

3. The method for elastic object deformation modeling according to claim 1, wherein obtaining a reference shape of the simulation tetrahedral mesh model corresponding to a current material property coefficient of the elastic object comprises:

verifying whether the current material property coefficient and the reference shape of the simulation tetrahedral mesh model corresponding to the current material property coefficient of the elastic object satisfy a physical static equilibrium equation.

4. The method for elastic object deformation modeling according to claim 1, wherein obtaining an initial material property coefficient of the elastic object by:

selecting a first principal mode from a plurality of deformation modes during the deformation of the elastic object;

determining a vibration frequency corresponding to the first principal mode;

obtaining the initial material property coefficient of the elastic object according to a matching degree between the vibration frequency corresponding to the first principal mode and an actually acquired vibration frequency.

5. The method for elastic object deformation modeling according to claim 1, wherein performing the following operations in each iteration until the material property coefficient under a minimum positional deviation and a reference shape of the simulation tetrahedral mesh model corresponding to the material property coefficient under the minimum positional deviation are found comprises: using the following target equation to obtain a shape corresponding to a minimum resultant force residual error as the reference shape of the simulation tetrahedral mesh model:

$$\min F(X) = \min_{X} \Box RK(R^T x^s - X) - Mg \Box^2;$$

wherein, R is a rotation matrix, K is a stiffness matrix, $x^s$ is a static shape of the elastic object, X is a reference shape of the simulation tetrahedral mesh model, M is a mass of the elastic object, and g is an acceleration of gravity;

calculating a Jacobian matrix of the virtual elastic force applied to each node of the simulation tetrahedral mesh model relative to the reference shape of the simulation tetrahedral mesh model; the Jacobian matrix is:

$$\frac{\partial f}{\partial X_{ij}} = V'RB^T EB(Rx^s - X) + VR'B^T EB(Rx^s - X) +$$
$$VRB'^T EB(Rx^s - X) + VRB^T EB'(Rx^s - X) + VRB^T EB(R'x^s - e_{3(j-1)+i});$$

wherein, f is a virtual elastic force applied to each node of the simulation tetrahedral mesh model, $X_{ij}$ is a position of the $i^{th}$ node in direction j in the reference shape of the simulation tetrahedral mesh model, $x^s$ is a static shape of the elastic object, X is the reference shape of the simulation tetrahedral mesh model, V is a volume of each tetrahedral element of the simulation tetrahedral mesh model, E is a constant matrix related to the material property of the elastic object, and R is a rigid rotation matrix representing each tetrahedral element of the simulation tetrahedral mesh model.

6. The method for elastic object deformation modeling according to claim 1, wherein estimating material property coefficients of the elastic object comprises:
   selecting a plurality of nodes from different positions in the simulation tetrahedral mesh model as control points;
   estimating different material property coefficients of the control points at different positions according to a material distribution property of the elastic object;
   calculating material property coefficients of other nodes of the simulation tetrahedral mesh model according to a linear interpolation algorithm and the different material property coefficients of the control points at different positions.

7. A device for elastic object deformation modeling, comprising a processor configured to:
   acquire a static point cloud of the elastic object and dynamic point cloud sequences during the deformation;
   establish a simulation tetrahedral mesh model for simulating the deformation of the elastic object according to the static point cloud;
   drive the simulation tetrahedral mesh model to track the dynamic point cloud sequences, to obtain track deformation sequences of the simulation tetrahedral mesh model;
   iteratively estimating material property coefficients and reference shape of the elastic object; performing the following operations in each iteration until the material property coefficient and its corresponding reference shape achieve a minimum positional deviation: obtaining a reference shape of the simulation tetrahedral mesh model corresponding to a current material property coefficient of the elastic object; driving the simulation tetrahedral mesh model to simulate the deformation of the elastic object from the same condition with initial deformation of track deformation sequences according to the current material property coefficient and the reference shape of the elastic object to obtain simulation deformation sequences of the simulation tetrahedral mesh model; calculating a positional deviation between the simulation deformation sequences and the track deformation sequences; and updating the material property coefficients of the elastic object in a direction in which the positional deviation is decreased;
   establishing a deformation model using the material property coefficient and its corresponding reference shape of the elastic object which can achieve minimum positional deviation;
   the processor is further configured to, when establishing the simulation tetrahedral mesh model, establish a static surface mesh model of the elastic object according to the static point cloud; establish the simulation tetrahedral mesh model for simulating the deformation of the elastic object according to the static surface mesh model; wherein a vertex of the static surface mesh model is in a linear interpolation relationship with tetrahedral node coordinates contains the vertex in the simulation tetrahedral mesh model, and interpolation coefficients of the linear interpolation relationship are the barycenter coordinates of the tetrahedral;
   the processor is further configured to:
   when acquiring a static point cloud of the elastic object and dynamic point cloud sequences during the deformation, acquire all the dynamic point cloud sequences after the elastic object is deformed;
   when driving the simulation tetrahedral mesh model to track the dynamic point cloud sequences, to obtain track deformation sequences of the simulation tetrahedral mesh model, find a maximum probability corresponding relation between the dynamic point cloud sequences and all nodes of the simulation tetrahedral mesh model after the elastic object is deformed; apply a virtual external force to each node of the simulation tetrahedral mesh model according to the maximum probability corresponding relationship, and drive each node of the simulation tetrahedral mesh model to track dynamic point cloud sequences of the elastic object corresponding to the node, to obtain a position of each node of the deformed simulation tetrahedral mesh model; find a position of each vertex of the deformed static surface mesh model, according to the linear interpolation of the node position; calculate a difference between the position of each vertex of the deformed static surface mesh model and a position of the dynamic point cloud sequences corresponding to the vertex after the elastic object is deformed, and obtain the track deformation sequences of the simulation tetrahedral mesh model until the difference is smaller than a predetermined value.

8. The device for elastic object deformation modeling according to claim 7, wherein the difference is smaller than the predetermined value comprises: a distance between each vertex of the deformed static surface mesh model and the dynamic point cloud sequences corresponding to the vertex after the elastic object is deformed is smaller than a predetermined distance, or an attractive force between each vertex of the deformed static surface mesh model and the dynamic point cloud sequences corresponding to the vertex after the elastic object is deformed is smaller than a predetermined attractive force.

9. The device for elastic object deformation modeling according to claim 7, wherein the processor is further configured to, when obtaining a reference shape of the simulation tetrahedral mesh model corresponding to a current material property coefficient of the elastic object, verify whether the current material property coefficient and the reference shape of the simulation tetrahedral mesh model corresponding to the current material property coefficient of the elastic object satisfy a physical static equilibrium equation.

10. The device for elastic object deformation modeling according to claim 7, wherein the processor is further configured to, when obtaining a reference shape of the simulation tetrahedral mesh model corresponding to a current material property coefficient of the elastic object, obtain an initial material property coefficient of the elastic object by:
selecting a first principal mode from a plurality of deformation modes during the deformation of the elastic object;
determining a vibration frequency corresponding to the first principal mode;
obtaining the initial material property coefficient of the elastic object according to a matching degree between the vibration frequency corresponding to the first principal mode and an actually acquired vibration frequency.

11. The device for elastic object deformation modeling according to claim 7, wherein the processor is further configured to, when performing the following operations in each iteration until the material property coefficient under a minimum positional deviation and a reference shape of the simulation tetrahedral mesh model corresponding to the material property coefficient under the minimum positional deviation are found, use the following target equation to obtain a shape corresponding to a minimum resultant force residual error as the reference shape of the simulation tetrahedral mesh model:

$$\min F(X) = \min_{X} \| RK(R^T x^s - X) - Mg \|^2;$$

wherein, R is a rotation matrix, K is a stiffness matrix, $x^s$ is a static shape of the elastic object, X is a reference shape of the simulation tetrahedral mesh model, M is a mass of the elastic object, and g is an acceleration of gravity;
calculate a Jacobian matrix of the virtual elastic force applied to each node of the simulation tetrahedral mesh model relative to the reference shape of the simulation tetrahedral mesh model; the Jacobian matrix is:

$$\frac{\partial f}{\partial X_{ij}} = V'RB^T EB(Rx^s - X) + VR'B^T EB(Rx^s - X) +$$
$$VRB'^T EB(Rx^s - X) + VRB^T EB'(Rx^s - X) + VRB^T EB(R'x^s - e_{3(j-1)+i});$$

wherein, f is a virtual elastic force applied to each node of the simulation tetrahedral mesh model, $X_{ij}$ is a position of the $i^{th}$ node in direction j in the reference shape of the simulation tetrahedral mesh model, $x^s$ is a static shape of the elastic object, X is the reference shape of the simulation tetrahedral mesh model, V is a volume of each tetrahedral element of the simulation tetrahedral mesh model, E is a constant matrix related to the material property of the elastic object, and R is a rigid rotation matrix representing each tetrahedral element of the simulation tetrahedral mesh model.

12. The device for elastic object deformation modeling according to claim 7, wherein the processor is further configured to, when estimating the material property coefficients of the elastic object, select a plurality of nodes from different positions in the simulation tetrahedral mesh model as control points; estimate different material property coefficients of the control points at different positions according to a material distribution property of the elastic object; and calculate material property coefficients of other nodes of the simulation tetrahedral mesh model according to a linear interpolation algorithm and the different material property coefficients of the control points at different positions.

* * * * *